UNITED STATES PATENT OFFICE.

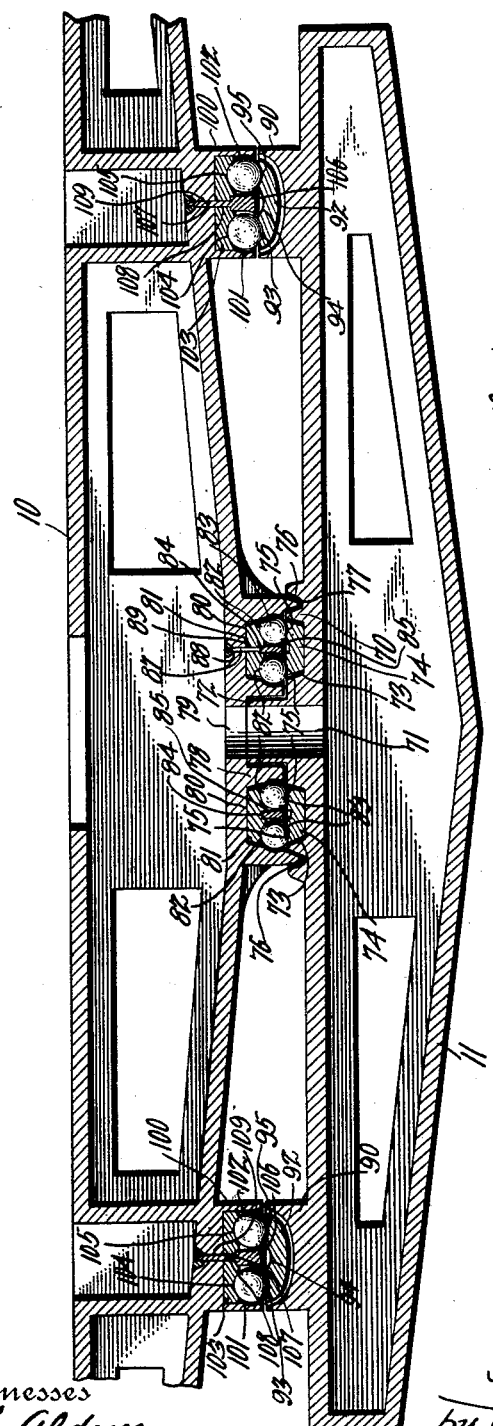

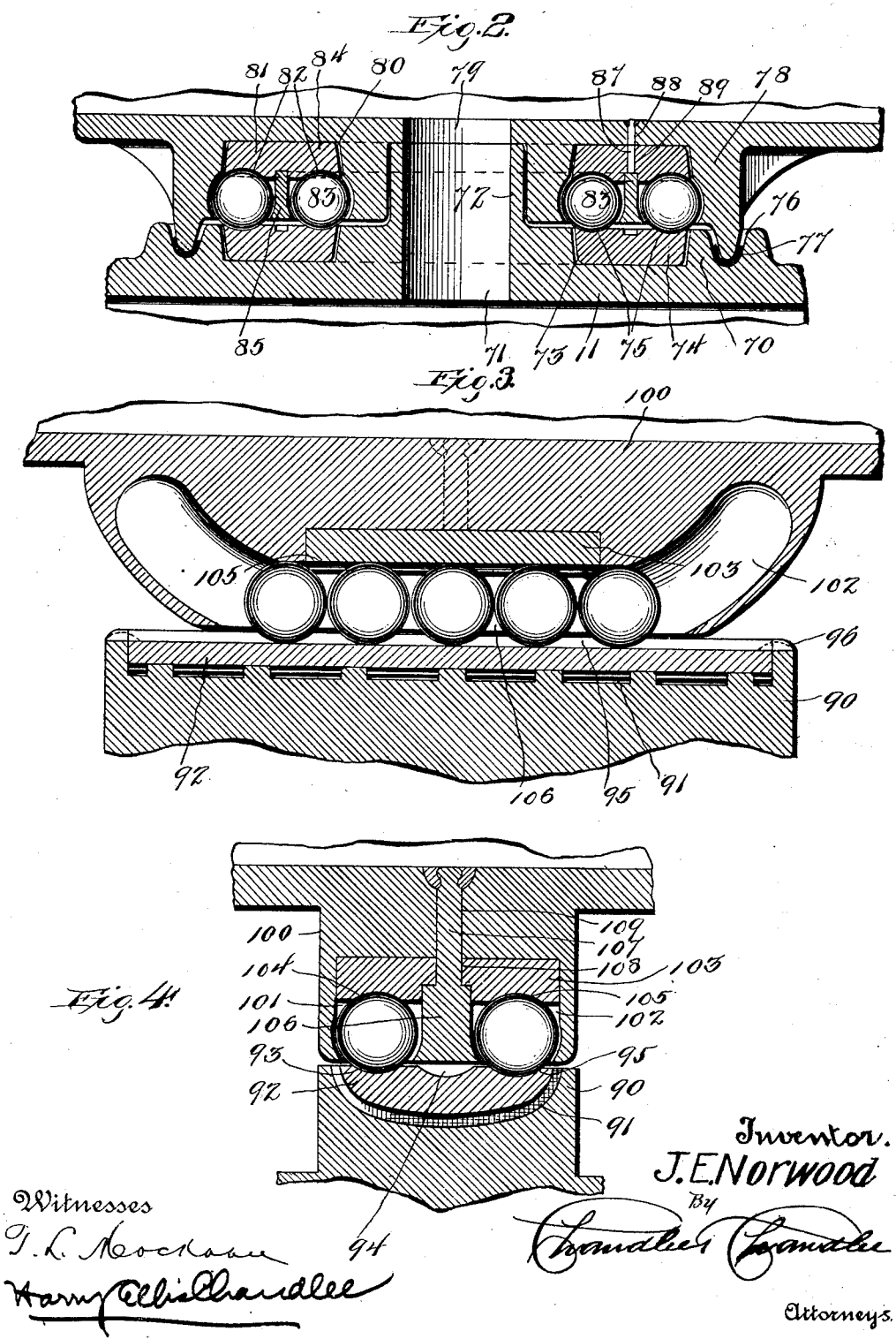

JOHN E. NORWOOD, OF BALTIMORE, MARYLAND, ASSIGNOR TO BALTIMORE BALL BEARING COMPANY, OF BALTIMORE, MARYLAND, A CORPORATION OF MARYLAND.

CAR BOLSTER AND BEARING.

SPECIFICATION forming part of Letters Patent No. 717,114, dated December 30, 1902.

Application filed May 27, 1902. Serial No. 109,155. (No model.)

*To all whom it may concern:*

Be it known that I, JOHN E. NORWOOD, a citizen of the United States, residing at Baltimore, in the State of Maryland, have invented certain new and useful Improvements in Car Bolsters and Bearings; and I do hereby declare the following to be a full, clear, and exact description of the invention, such as will enable others skilled in the art to which it appertains to make and use the same.

This invention relates to railway-cars, and more particularly to the truck and body bolsters and their center and side bearings, which sustain the weight of the car, the object of the invention being to provide truck and body bolsters wherein the casings for the balls are formed integral with the bolsters, such casings having such structures, however, as will permit them to be made separate from and attached to the bolsters, if desired.

A further object of the invention is to provide a combination, with the bolsters and the side bearings, of a form of center-bearing casing which will, by reason of the casings being integral with the bolsters, prevent the balls from riding laterally from the race-plates.

An additional object of the invention is to provide center and side bearings which will be efficient in their actions while sustaining enormous weights and in which the correlative positions of the side-bearing race-plates will be properly maintained.

Other objects and advantages of the invention will be understood from the following description.

In the drawings forming a portion of this specification, and in which like numerals of reference indicate similar parts in the several views, Figure 1 is a vertical section taken longitudinally through a pair of body and truck bolsters constructed and equipped in accordance with the present invention. Fig. 2 is an enlarged section through the bolsters and including the center bearing. Fig. 3 is a vertical section taken transversely through the ends of the bolsters and longitudinally of one of the ball-passages of a side bearing. Fig. 4 is an enlarged transverse section through a side bearing and including portions of the body and truck bolsters. Fig. 5 is a vertical section through the body and truck bolsters at one side of a side bearing.

Referring now to the drawings, there are shown two bolsters 10 and 11, which are the body and truck bolsters, respectively, of the car, these bolsters being each cast integral and having central and side bearing casings formed upon their lower and upper faces, respectively.

The center bearing comprises the lower casing 70, formed integral with the truck-bolster and having the central opening 71 to receive the king-bolt, said opening being continued through the boss 72, which is formed on the upper face of the casing and centrally thereof. In the upper face of the casing 70 and concentric therewith is formed the annular channel or seat 73, in which is disposed the lower annular race-plate 74, having the spaced transversely arc-shaped grooves 75 formed in its upper face and concentric with the boss and the opening therethrough. Exterior to the channel 73 is a channel 76, which receives the dust-excluding packing 77.

On the upper or body bolster 10 is cast the upper bearing-casing 78, having a central opening 79 to receive the king-bolt and which opening is countersunken at its lower end to receive the boss 72, so that the two casings will be held against lateral displacement with respect to each other, and as the two casings are formed integral with their respective bolsters lateral displacement, as well as other horizontal displacements, of the bolsters will be prevented.

In the lower face of the casing 78 and concentric therewith is formed the channel or seat 80, which receives the upper race-plate 81, which latter has the spaced transversely-arc-shaped channels 82 in its lower face and which lie above the corresponding channels 75 of the race-plate 74 and receive in connection therewith the bearing-balls 83. Midway between the channels 82 is the transversely-rectangular channel 84, in which is engaged the upper edge of a retaining-ring 85, the side faces of which are curvingly converged from the lower edge of the ring, so that they may fit partly under the balls 83 to hold the balls in their respective passages in connection with the concaved walls 86 of the lower part of the channel or groove 80. To hold both the race-plate 81 and the retaining-ring 85 in position, said ring has a narrowed stem 87, or a number of such stems, which project upwardly from the upper edge of the ring and which engage in corresponding alining perforations 88 and 89 in the bolster and race-plate, respectively. The upper ends of the perforations 88 are countersunken, and the upper ends of the stems are peripherally grooved, so that soft metal may be cast into the countersinks and will engage the peripheral grooves to prevent withdrawal of the stems.

Referring now to Fig. 4 of the drawings, the lower or truck bolster has a bearing-casing 90 cast upon its upper face and in the upper face of which casing is the cross-sectionally arc-shaped seat 91, which receives the race-plate 92, the under side of which is shaped to correspond to the seat, so that the race-plate may have a tilting movement in a plane including the king-bolt of the truck. In the upper face of the race-plate are formed the three grooves 93, 94, and 95, which are concentric to the king-bolt, the outside grooves or channels being transversely arc-shaped, while the center groove or channel may have a different shape, the object of the center channel being to receive the malleable ears 96 at the ends of the casing, which are bent down into the channel at its ends to prevent displacement of the race-plate in shipment.

The upper bearing-casing is shown at 100 and is formed upon the under face of the body-bolster, this casing including a central straight ball-passage with inclined end portions. In the place of a single portion, however, there are two ball-passages, (shown at 101 and 102,) which are spaced laterally from each other, and for the straight portions of the two passages there is provided a single race-plate 103, having arc-shaped channels 104 and 105 in its under face, which correspond to and aline with the inclined end portions of their respective ball-passages. The outer side walls of the ball-passages are integral with the casing and are concaved to fit part way around the balls, and between the two series of balls is disposed a retaining-plate 106, having concaved side walls which also fit part way around the balls. The retaining-plate engages in a longitudinal groove in the under side of the race-plate, midway between the ball-receiving channels of the latter, and has a stem 107, which is passed through alining perforations 108 and 109 in the race-plate and casing, the upper end of the perforations 109 being countersunken and the stem being peripherally grooved, so that a seal may be cast into the countersink to hold the stem, and therewith the wear-plate and spacing-plate, to the casing.

With this construction a much greater bearing-surface is secured than where a single set of balls is employed, and by mounting the lower race-plate to rock the race-plates of the upper and lower members may lie parallel at all times to prevent binding.

What is claimed is—

1. The combination with a body-bolster having central and side bearing casings formed integral therewith of a truck-bolster having central and side bearing casings formed integral therewith and corresponding to the central and side bearing casings of the body-bolster respectively, said casings having race-plates and rotatable bodies disposed between the race-plates of the corresponding casings.

2. The combination with a body-bolster having a casing formed integral therewith of a truck-bolster having a casing formed integral therewith, race-plates in the casing of the body and truck bolsters, and rotatable bearing-bodies in contact with the race-plates and adapted to hold the bolsters in spaced relation.

3. The combination with the body and truck bolsters of casings formed integral therewith and containing race-plates said casings having central openings to receive a king-bolt the opening of one casing being countersunken and the other casing having a boss engaged in the countersink to hold the casings and bolsters against horizontal displacement, and rotatable bearing-bodies in contact with the race-plates.

4. In a roller-bearing for cars, the combination with a casing having spaced ball-passages therein, of a race-plate common to both passages and having bearing portions corresponding to the passages, spacing means between the passages and means carried by the spacing means and engaged with the casing for holding the spacing means and the race-plate against displacement.

5. In a side bearing for cars, the combination with upper and lower race-plates, one of which is mounted for rocking movement in a plane transverse to the line of travel on the race-plate, and separate series of rotatable bodies disposed between the race-plates and intersecting the plane of rocking movement of said race-plate.

6. In a side bearing for cars the combination with a race-plate having spaced parallel races, said plate being mounted to rock in a plane transverse to the races, of rotatable bodies disposed in the races and a second race-plate disposed to bear upon said bodies.

In testimony whereof I affix my signature in presence of two witnesses.

JOHN E. NORWOOD.

Witnesses:
   THOS. C. BAILEY,
   SAML. BEALMEAR.